US012725813B2

(12) United States Patent
Her et al.

(10) Patent No.: US 12,725,813 B2
(45) Date of Patent: Sep. 1, 2026

(54) FUEL CELL MEMBRANE HUMIDIFIER

(71) Applicant: KOLON INDUSTRIES, INC., Seoul (KR)

(72) Inventors: Jung Kun Her, Seoul (KR); Do Woo Kim, Seoul (KR); Woong Jeon An, Seoul (KR); Kyoung Ju Kim, Seoul (KR)

(73) Assignee: KOLON INDUSTRIES, INC., Seoul (KR)

(*) Notice: Subject to any disclaimer, the term of this patent is extended or adjusted under 35 U.S.C. 154(b) by 595 days.

(21) Appl. No.: 18/253,622

(22) PCT Filed: Dec. 9, 2021

(86) PCT No.: PCT/KR2021/018600
§ 371 (c)(1),
(2) Date: May 19, 2023

(87) PCT Pub. No.: WO2022/145791
PCT Pub. Date: Jul. 7, 2022

(65) Prior Publication Data
US 2024/0006633 A1 Jan. 4, 2024

(30) Foreign Application Priority Data
Dec. 31, 2020 (KR) ........................ 10-2020-0189594

(51) Int. Cl.
*H01M 8/04119* (2016.01)
*B01D 63/02* (2006.01)
*B01D 63/04* (2006.01)

(52) U.S. Cl.
CPC ...... *H01M 8/04149* (2013.01); *B01D 63/031* (2022.08); *B01D 63/04* (2013.01)

(58) Field of Classification Search
CPC .. H01M 8/04149; B01D 63/031; B01D 63/04
See application file for complete search history.

(56) References Cited

U.S. PATENT DOCUMENTS 7,361,211 B2 4/2008 Berger
2001/0021467 A1 9/2001 Suzuki

FOREIGN PATENT DOCUMENTS

CN 109378502 A 2/2019
JP 2001-201120 A 7/2001
(Continued)

OTHER PUBLICATIONS

JP_2002298895 Translation (Year: 2002).*
(Continued)

*Primary Examiner* — Jimmy Vo
(74) *Attorney, Agent, or Firm* — Harvest IP Law, LLP

(57) ABSTRACT

The present disclosure provides a fuel cell membrane humidifier capable of improving humidification efficiency by increasing a flow time in a humidifying module, and the fuel cell membrane humidifier according to an embodiment of the present disclosure, includes: a mid-case; an off-gas inlet formed in a direction inclined at a predetermined angle with respect to one surface of the mid-case through which off-gas discharged from the fuel cell stack is introduced; and at least one cartridge disposed in the mid-case and including an inner case accommodating a plurality of hollow fiber membranes therein, and a potting part fixing ends of the hollow fiber membranes.

4 Claims, 6 Drawing Sheets

(56) References Cited

FOREIGN PATENT DOCUMENTS

| | | | | | |
|---|---|---|---|---|---|
| JP | 2002298895 | A | * | 10/2002 | |
| JP | 2008-103115 | A | | 5/2008 | |
| JP | 2008289996 | A | | 12/2008 | |
| JP | 2010-151339 | A | | 7/2010 | |
| JP | 5060461 | B2 | | 10/2012 | |
| JP | 2014191866 | A | | 10/2014 | |
| JP | 2016-35895 | A | | 3/2016 | |
| KR | 20180099034 | A | | 9/2018 | |
| KR | 1020190140855 | A | | 12/2019 | |
| KR | 20200020516 | A | | 2/2020 | |
| KR | 10-2020-0122211 | A | | 10/2020 | |
| KR | 20200122211 | A | | 10/2020 | |
| WO | WO-2019132141 | A1 | * | 7/2019 | ........... B01D 63/031 |

OTHER PUBLICATIONS

WO_2019132141 Translation (Year: 2019).*
European Search Report dated Aug. 29, 2024.
1st Office Action dated May 2, 2024.

* cited by examiner 100
120
110
113
112
11d
111
131
133
132
130
120

*FIG. 4*

FUEL CELL MEMBRANE HUMIDIFIER

TECHNICAL FIELD

The present disclosure relates to a fuel cell membrane humidifier, and more particularly, to a fuel cell membrane humidifier capable of improving humidification efficiency by increasing a flow time within a humidifying module.

BACKGROUND ART

A fuel cell is a power-generating cell that produces electricity by combining hydrogen and oxygen. A fuel cell can continuously produce electricity as long as hydrogen and oxygen are supplied, unlike conventional chemical batteries such as dry cells and storage batteries, and has the advantage of being about twice as efficient as internal combustion engines because there is no heat loss.

In addition, because chemical energy generated by a combination of hydrogen and oxygen is directly converted into electrical energy, fuel cells emit fewer pollutants. Therefore, fuel cells are not only environmentally friendly characteristics, but also reducing concerns about resource depletion due to increasing energy consumption."

Depending on the type of electrolyte used, these fuel cells may be classified largely into Polymer Electrolyte Membrane Fuel Cell (PEMFC), Phosphoric Acid Fuel Cell (PAFC), and Molten Carbonate Fuel Cell (MCFC), solid oxide fuel cell (SOFC), and alkaline fuel cell (AFC).

Although each of these fuel cells operates on the same fundamental principle, they differ in the type of fuel used, operating temperature, catalyst, electrolyte, and other factors. Among them, Polymer Electrolyte Membrane Fuel Cell (PEMFC) is known to be the most promising fuel cell not only in small-scale stationary power generation equipment, but also in transportation systems, due to its operation at low temperatures compared to other fuel cells and high power density, which allows for miniaturization.

One of the most important factors in improving the performance of Polymer Electrolyte Membrane Fuel Cells (PEMFC) is to maintain function efficiency by supplying a certain amount of moisture to the Polymer Electrolyte Membrane (PEM) or Proton Exchange Membrane in the Membrane Electrode Assembly (MEA)." This is because when the polymer electrolyte membrane is dried, power generation efficiency is rapidly reduced.

There are several methods to humidify a Polymer Electrolyte Membrane, including 1) a bubbler humidification method for supplying moisture by passing a target gas through a diffuser after filling a pressure vessel with water, 2) a direct injection method for supplying moisture directly to a gas flow path through a solenoid valve by calculating a required moisture supply for fuel cell reaction, and 3) a membrane humidifying method for supplying moisture to a gas fluid layer using a polymer separation membrane.

Among these methods, a membrane humidifying method for humidifying a polymer electrolyte membrane by supplying water vapor to air to be supplied to the polymer electrolyte membrane by use of a membrane which selectively allows only water vapor included in off-gas to pass therethrough is advantageous in that the membrane humidifier can be lightweight and miniaturized.

The selective permeable membrane used in the membrane humidifying method is preferably a hollow fiber membrane having a large permeable area per unit volume when a module is formed. In other words, when a membrane humidifier is manufactured using a hollow fiber membrane, high integration of hollow fiber membrane with large contact surface area is possible, so it is possible to sufficiently humidify a fuel cell even with a small capacity, to use low-cost materials, and to recover moisture and heat contained in off-gas discharged at a high temperature from the fuel cell and thus reuse the recovered moisture and heat through the membrane humidifier.

FIG. 1 is an exploded perspective view showing a fuel cell membrane humidifier according to a related art, and FIG. 2 is a cross-sectional view showing a fuel cell membrane humidifier according to a related art.

As shown in FIGS. 1 and 2, a fuel cell membrane humidifier 10 of the related art includes a humidifying module 11*a* in which moisture is exchanged between air supplied from an outside and off-gas discharged from a fuel cell stack (not shown), and caps 12 coupled to both ends of the humidifying module 11*a*.

One of the caps 12 supplies air supplied from the outside to the humidifying module 11*a*, and the other one supplies air humidified by the humidifying module 11*a* to the fuel cell stack.

The humidifying module 11*a* includes a mid-case 11*a* having an off-gas inlet 11*aa* and an off-gas outlet 11*ab*, and at least one cartridge 13 disposed within the mid-case 11*a*. One cartridge is illustrated in the drawings. The cartridge 13 includes an inner case 13*a*, and inside the inner case 13*a*, and a plurality of hollow fiber membranes 13*b* and a potting part 13*c* for fixing both ends of a bundle of hollow fiber membranes 13*b* are formed in the inner case 13*a*. The potting part 13*c* is generally formed by curing a liquid polymer such as liquid polyurethane resin through a casting method.

A resin layer 11*c* is formed between the cartridge 13 and the mid-case 11*a*, and the resin layer 11*c* fixes the cartridge 13 to the mid-case 11*a* and covers the internal spaces of the caps 12 and the internal spaces of the mid-case 11*a*.

The internal space of the mid-case 11*a* is divided into a first space S1 and a second space S2 by partitions 11*c*. The inner case 13*a* includes a first mesh hole MH1 arranged in a mesh form for fluid communication with the first space S1, and a second mesh hole MH2 arranged in a mesh form for fluid communication with the second space S2.

Off-gas flowing into the first space S1 of the mid-case 11*a* through the off-gas inlet 11*aa* flows into the inner case 13*a* through the first mesh hole MH1 and comes into contact with outer surfaces of the hollow fiber membranes 13*b*. Subsequently, the off-gas deprived of moisture exits to the second space S2 through the second mesh hole MH2 and is then discharged from the mid-case 11*a* through the off-gas outlet 11*ab*.

DISCLOSURE

Technical Problem

An objective of the present disclosure is to provide a fuel cell membrane humidifier capable of improving humidification efficiency by increasing a flow time in a humidifying module.

Technical Solution

A fuel cell membrane humidifier according to an embodiment of the present disclosure, includes: an off-gas inlet through which off-gas discharged from the fuel cell stack is introduced, and which is formed in an inclined direction at a predetermined angle with respect to one surface of the mid-case; and at least one cartridge disposed in the mid-case, and comprising an inner case for accommodating a plurality of hollow fiber membranes therein and a potting part for fixing ends of the hollow fiber membranes.

In the fuel cell membrane humidifier according to an embodiment of the present disclosure, a lower end of the off-gas inlet may be inclined toward the potting part so that the off-gas flows into the potting part.

In the fuel cell membrane humidifier according to an embodiment of the present disclosure, the inner case may include a first mesh hole through which the off-gas flows, and a second mesh hole through which the off-gas introduced through the first mesh hole exchanges moisture and is discharged to an outside, and the first mesh hole and the second mesh hole may be formed in an asymmetrical shape.

In the fuel cell membrane humidifier according to an embodiment of the present disclosure, a total area of mesh hole windows on a side of the first mesh hole may be larger than a total area of mesh hole windows on a side of the second mesh hole.

In the fuel cell membrane humidifier according to an embodiment of the present disclosure, in a case where a size of mesh hole windows of the first mesh hole is equal to a size of mesh hole windows of the second mesh hole, a number of mesh hole windows of the first mesh hole may be greater than a number of mesh hole windows of the second mesh hole.

In the fuel cell membrane humidifier according to an embodiment of the present disclosure, in a case where a number of mesh hole windows of the first mesh hole is equal to a number of mesh hole windows of the second mesh hole, an area of each mesh hole window of the first mesh hole may be greater than an area of each mesh hole window of the second mesh hole.

Other specific details of implementations according to various aspects of the present disclosure are included in the detailed description below.

Advantageous Effects

According to an embodiment of the present disclosure, it is possible to improve humidification efficiency by increasing a flow time in a humidifying module.

DESCRIPTION OF DRAWINGS

FIG. 4 is a cross-sectional view showing a fuel cell membrane humidifier according to an embodiment of the present disclosure.

MODE FOR DISCLOSURE

The present disclosure may include various modifications and embodiments, and therefore, the present disclosure will be explained in detail by taking exemplary embodiments. However, this is not intended to limit the present disclosure to the particular exemplary embodiments, and it should be noted that the present disclosure is intended to include all variations, equivalents, and substitutions that are included in the technical scope of the idea of the present disclosure.

The terms and expressions used in the present disclosure are used only for the purpose of illustrating particular embodiments, and are not intended to limit the present disclosure. Unless stated otherwise, an expression of singularity is intended to include expressions of plurality. It should be noted that the terms "include" or "have" as used in the present disclosure are intended to denote the existence of any features, numerical values, steps, operations, constituent elements, parts, and combinations thereof described in the specification, but are not intended to preliminarily exclude the possibility of existence or addition of any one or more other features, numerical values, steps, operations, constituent elements, parts, and combinations thereof. Hereinafter, a fuel cell membrane humidifier according to an embodiment of the present disclosure will be described with reference to the drawings.

Figure 1:
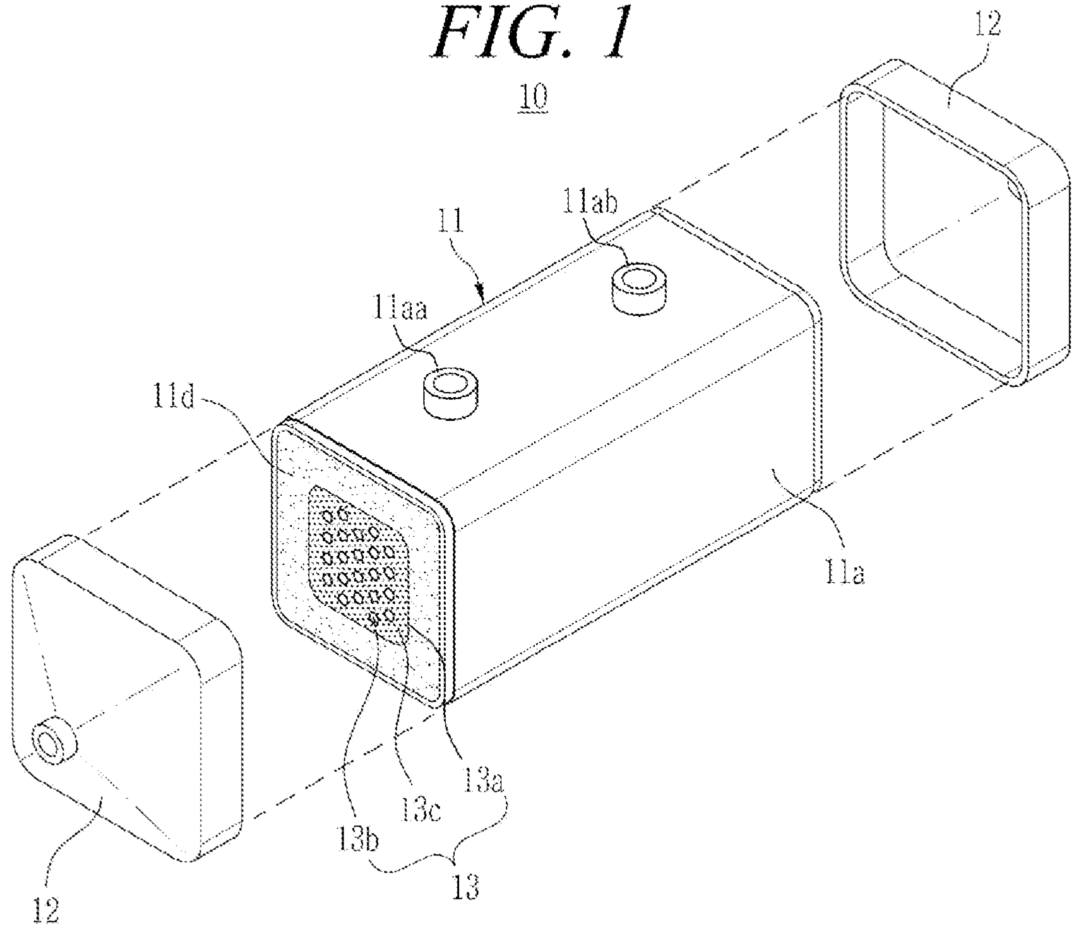
FIG. 1 is an exploded perspective view showing a fuel cell membrane humidifier according to a related art.
Figure 2:
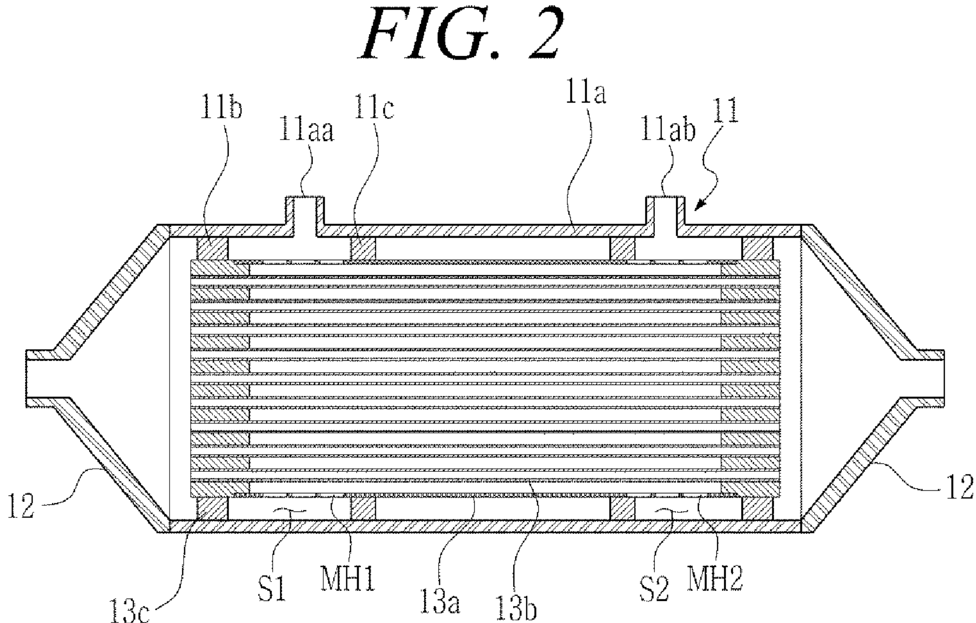
FIG. 2 is a cross-sectional view showing a fuel cell membrane humidifier according to a related art.
Figure 3:
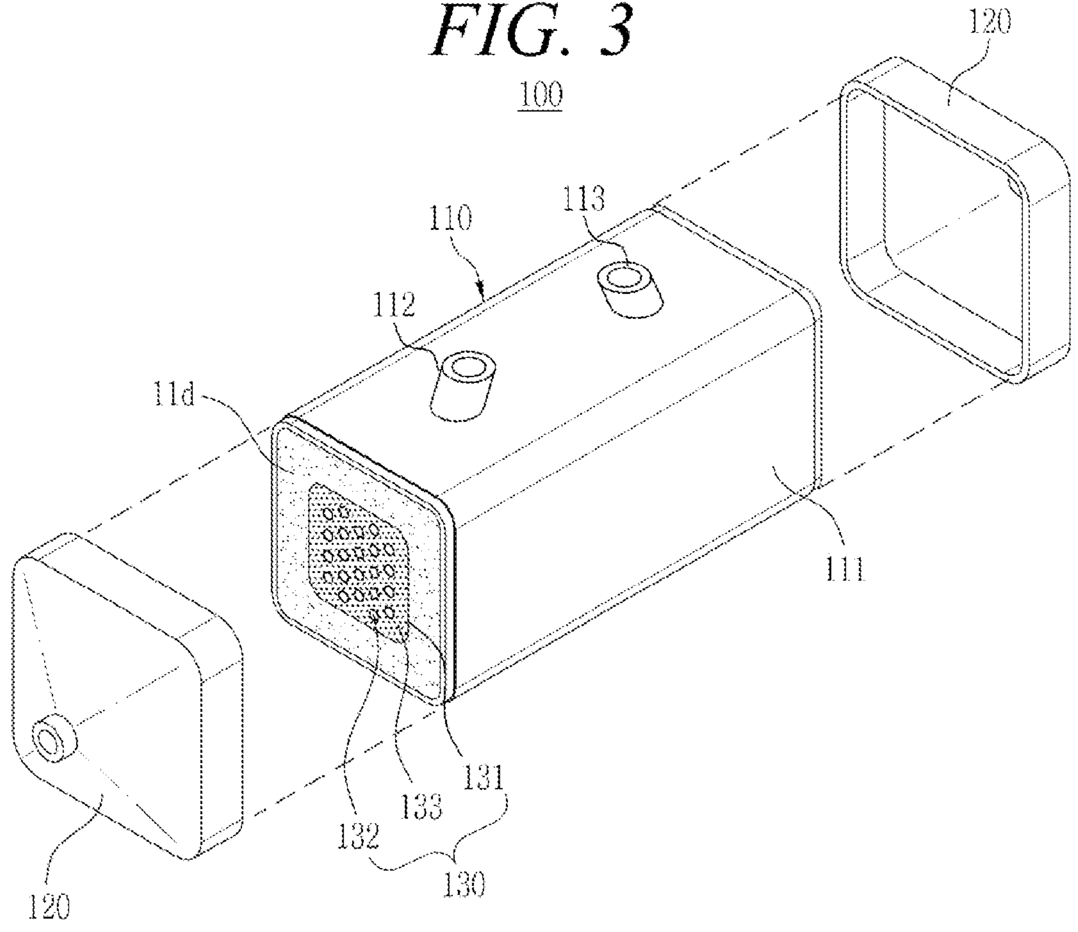
FIG. 3 is an exploded perspective view showing a fuel cell membrane humidifier according to an embodiment of the present disclosure.
Figure 4:
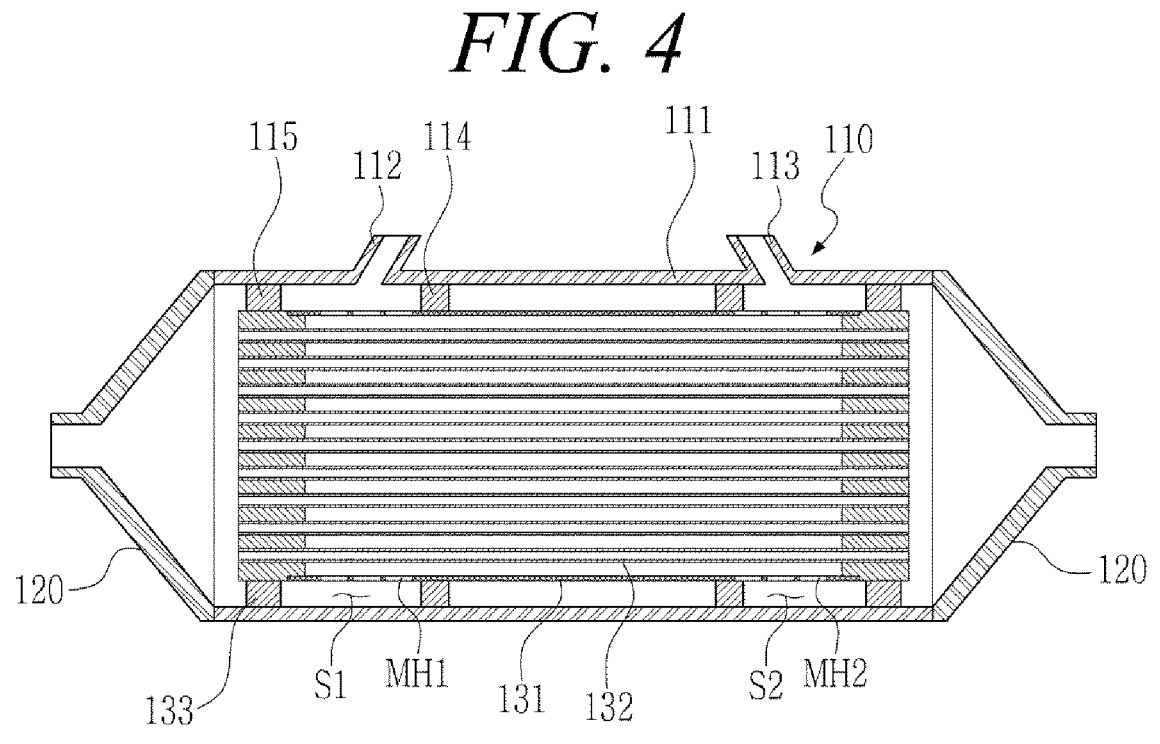

FIG. 3 is an exploded perspective view showing a fuel cell membrane humidifier according to an embodiment of the present disclosure, and FIG. 4 is a cross-sectional view showing a fuel cell membrane humidifier according to an embodiment of the present disclosure.

As shown in FIGS. 3 and 4, a fuel cell membrane humidifier 100 according to an embodiment of the present disclosure includes a humidifying module 110 and caps 120.

The humidifying module 110 performs moisture exchange between air supplied from the outside and off-gas discharged from a fuel cell stack (not shown). The caps 120 are coupled to both ends of the humidifying module 110. One of the caps 120 supplies air, supplied from the outside, to the humidifying module 110, and the other supplies air, humidified by the humidifying module 110, to the fuel cell stack.

The humidifying module 110 includes a mid-case 111 having an off-gas inlet 112 and an off-gas outlet 113, and at least one cartridge 130 disposed in the mid-case 111. In this case, the off-gas inlet 112 is formed in a direction inclined at a predetermined angle to improve the humidification efficiency by increasing a flow time of off-gas in the humidifying module 110. This will be described later.

The mid-case 111 and the caps 120 may be each independently formed of a hard plastic or metal, and may each have a circular or polygonal cross section in a width direction. The "circular" includes oval, and the "polygonal" includes a polygon with rounded corners. For example, the hard plastic may be polycarbonate, polyamide (PA), polyphthalamide (PPA), polypropylene (PP), or the like. An internal space of the mid-case 111 may be partitioned into a first space S1 and a second space S2 by partitions 114.

The cartridge 130 may include a plurality of hollow fiber membranes 132 and a potting part 133 for fixing the hollow fiber membranes to one other. Ends of the hollow fiber membranes 132 may be fixed to the potting part 133.

In addition, the cartridge 130 may further include an inner case 131. The inner case 131 has an opening at each end, and the hollow fiber membranes 132 are contained in the opening. The potting part 133 in which ends of the hollow fiber membranes 132 are potted closes the openings of the inner case 131.

The inner case 131 includes a first mesh hole MH1 arranged in a mesh form to allow fluid communication with the first space S1, and a second mesh hole MH2 arranged in a mesh form to allow fluid communication with the second space S2.

Exhaust gas flowing into the first space S1 of the mid-case 111 through the off-gas inlet 112 flows into the inner case 131 through the first mesh hole MH1 and then comes into contact with outer surfaces of the hollow fiber membranes 132. Subsequently, the off-gas deprived of moisture exits to the second space S2 through the second mesh hole MH2 and is then discharged from the mid-case 111 through the off-gas outlet 113. The cartridge 130 including the inner case 131 has the advantages of being easily assembled to the mid-case 111 and easily replaced.

The hollow fiber membrane 132 may include polysulfone resin, polyethersulfone resin, sulfonated polysulfone resin, polyvinylidene fluoride (PVDF) resin, polyacrylonitrile (PAN) resin, polyimide resin, polyamideimide resin, polyesterimide resin, or a polymer film formed of a mixture of at least two selected therefrom, and the potting part 133 may be formed by curing a liquid resin such as liquid polyurethane resin by a casting method such as deep potting or centrifugal potting.

A resin layer 115 is formed between the cartridge 130 and the mid-case 111, and the resin layer 115 fixes the cartridge 130 to the mid-case 111 and blocks internal spaces of the caps 120 and the internal space of the mid-case 111. Depending on the design, the resin layer 115 may be replaced with a gasket assembly that is air-tightly coupled to each end of the humidifying module 110 through mechanical assembling.

Referring back to FIGS. 3 and 4, the off-gas inlet 112 is formed in a direction inclined at a predetermined angle with respect to one surface of the mid-case 111.

More specifically, the off-gas inlet 112 is formed with a lower end of the off-gas inlet 112 inclined toward the potting part 133 so that the off-gas flows into the potting part 133.

As the off-gas inlet 112 is inclined in a direction toward the potting part 133, the off-gas flows into the inner case 131 through the first mesh hole MH1 while forming an inclination toward the potting part 133, and thus, the off-gas changes in direction in the potting part 133, so that a flow time in the inner case 131 can be increased, thereby improving the overall humidification efficiency.

Meanwhile, the off-gas outlet 113 does not necessarily have to be formed in an inclined direction, but may be formed symmetrically with the off-gas inlet 112 for design unification.

Figure 5:
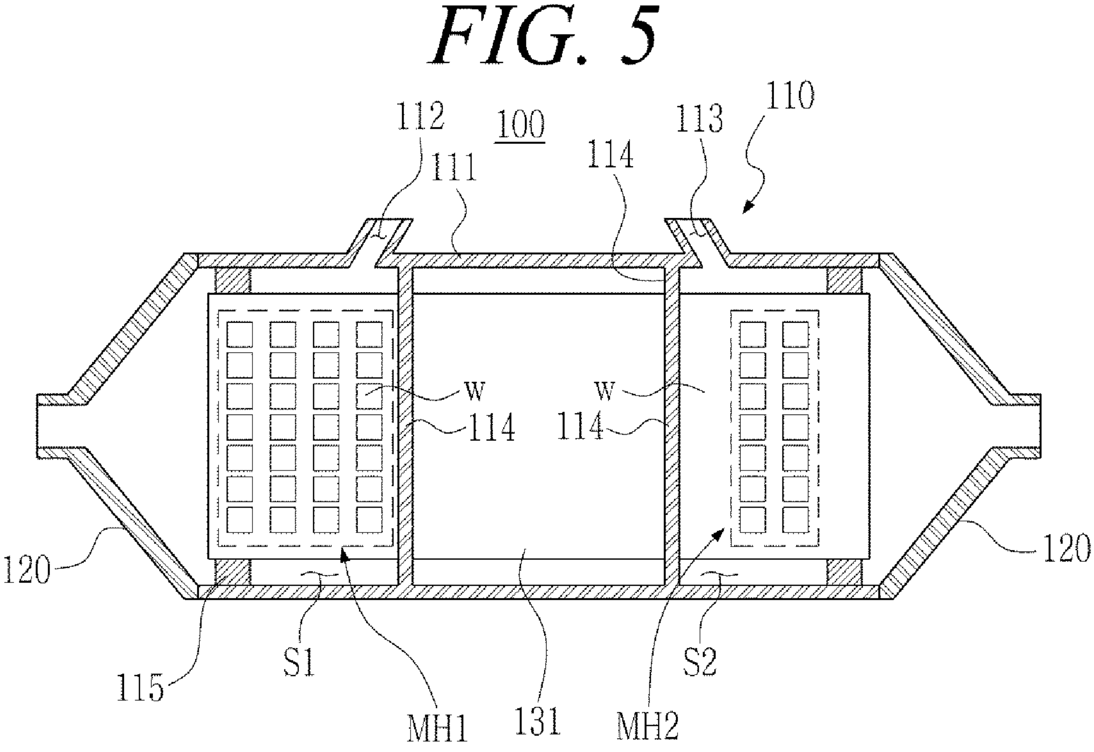
FIG. 5 is a cross-sectional view showing a fuel cell membrane humidifier including a cartridge according to an embodiment of the present disclosure.
Figure 6:
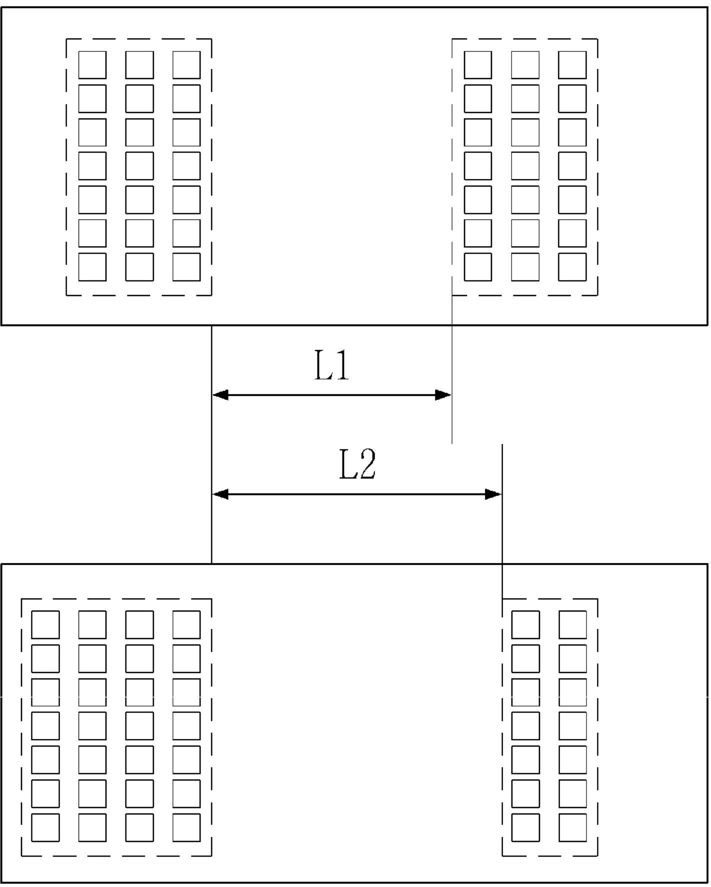
FIG. 6 is a plan view showing a cartridge according to an embodiment of the present disclosure.

Next, a cartridge that can be used in a fuel cell membrane humidifier according to an embodiment of the present disclosure will be described with reference to FIGS. 5 and 6. FIG. 5 is a cross-sectional view showing a fuel cell membrane humidifier including a cartridge according to an embodiment of the present disclosure, and FIG. 6 is a plan view showing a cartridge according to an embodiment of the present disclosure.

Referring to FIG. 5, a fuel cell membrane humidifier according to another embodiment of the present disclosure may include a cartridge having asymmetric mesh holes. Here, the asymmetric mesh holes means that the mesh hole windows W forming the respective mesh holes MH1 and MH2 formed on the left and right sides of the inner case 131 are formed with different areas. A mesh hole window W is an opening through which off-gas is introduced and discharged.

The mesh hole window W of the first mesh hole MH1 formed on the side of the off-gas inlet 112 may be provided in a large area to facilitate the inflow of off-gas into the inner case 131, and the mesh hole window W of the first mesh hole MH2 formed on the side of the off-gas outlet 113 may be provided in a small area to promote the inflow of off-gas in the inner case 131.

In addition, with the mesh hole windows W formed in an asymmetrical shape, a distance between the first mesh hole MH1 and the second mesh hole MH2 may be increased, compared to a case where mesh hole windows W formed in a symmetrical shape, and accordingly, it is possible to increase a flow distance of the off-gas within the inner case 131. (See comparison of L1 and L2 in FIG. 6.) As the off-gas flow distance increases, the time of the off-gas to contact surfaces of the hollow fiber membranes 132 may be increased, thereby improving the overall humidification efficiency.

When the sizes of the mesh hole windows W of both mesh hole portions are the same, the entire area of the mesh hole windows W may be such that a number of mesh holes of the first mesh hole MH1 is greater than a number of mesh holes of the second mesh hole MH2.

In addition, when the mesh holes on the both sides have the same number of mesh hole windows W, a total area of the mesh hole windows W may be such that an area of each mesh hole of the first mesh hole MH1 is greater than an area of each mesh hole of the second mesh hole MH2.

As such, by forming the first mesh hole MH1 and the second mesh hole MH2 asymmetrically, it is possible to promote an off-gas flow in the inner case 131 and improve humidification efficiency according to an increased off-gas flow distance.

While the present disclosure has been particularly shown and described with reference to exemplary embodiments thereof, it will be understood by those of ordinary skill in the art that various modifications and changes may be made therein through inclusion, alteration, removal or addition of elements without departing from the spirit and scope of the present disclosure as defined by the following claims.

DETAILED DESCRIPTION OF MAIN ELEMENTS

100: fuel cell membrane humidifier
110: humidifying module 111: mid-case
112: off-gas inlet 113: off-gas outlet
114: partitions 115: resin layer
130: cartridge 131: inner case
132: hollow fiber membranes 133: potting part
MH1: first mesh hole MH2: second mesh hole

The invention claimed is:

1. A fuel cell membrane humidifier comprising:
a mid-case;
an off-gas inlet through which off-gas discharged from the fuel cell stack is introduced, and which is formed in an inclined direction at a predetermined angle with respect to one surface of the mid-case; and
at least one cartridge disposed in the mid-case, and comprising an inner case for accommodating a plurality of hollow fiber membranes therein and a potting part for fixing ends of the hollow fiber membranes,
wherein the inner case comprises a first mesh hole through which the off-gas flows, and a second mesh hole through which the off-gas introduced through the first mesh hole exchanges moisture and is discharged to an outside, and
wherein the first mesh hole and the second mesh hole are formed in an asymmetrical shape, wherein a total area of mesh hole windows on a side of the first mesh hole is larger than a total area of mesh hole windows on a side of the second mesh hole.

2. The fuel cell membrane humidifier of claim 1, wherein a lower end of the off-gas inlet is inclined toward the potting part so that the off-gas flows into the potting part.

3. The fuel cell membrane humidifier of claim 1, wherein in a case where a size of mesh hole windows of the first mesh hole is equal to a size of mesh hole windows of the second mesh hole, a number of mesh hole windows of the first mesh hole is greater than a number of mesh hole windows of the second mesh hole.

4. The fuel cell membrane humidifier of claim 1, wherein in a case where a number of mesh hole windows of the first mesh hole is equal to a number of mesh hole windows of the second mesh hole, an area of each mesh hole window of the first mesh hole is greater than an area of each mesh hole window of the second mesh hole.

* * * * *